May 8, 1945. W. N. HADLEY 2,375,732
SEAM PROTECTING DEVICE FOR CLOTH SHEARS
Filed Oct. 28, 1943
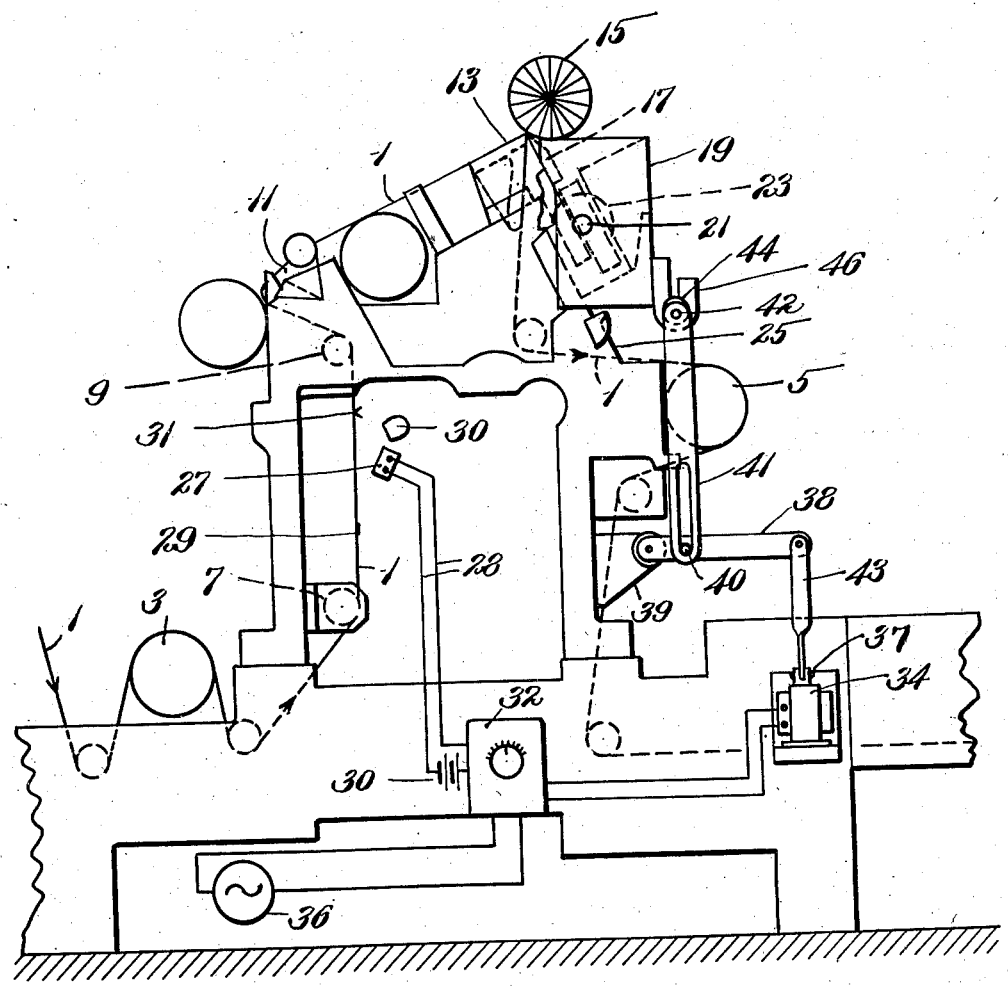
Inventor.
WILFRED N. HADLEY.
by Robert K. Randall,
Atty.

Patented May 8, 1945

2,375,732

UNITED STATES PATENT OFFICE 2,375,732

SEAM PROTECTING DEVICE FOR CLOTH SHEARS

Wilfred N. Hadley, Springfield, Vt., assignor to Parks and Woolson Machine Company, Springfield, Vt., a corporation Application October 28, 1943, Serial No. 507,951

7 Claims. (Cl. 26—17.)

This invention relates to cloth shearing machines utilizing rotary shear blades coacting with stationary ledger blades to shear the protruding fibers at the surface of the cloth to a uniform level of extent, the cloth being run rapidly through the machine and past these coacting blades in open and flat relation, being supported in close proximity to the blades usually by means of a rest solidly supporting the cloth at the shearing point. The spacing between this rest and the shearing blades is customarily so close that the increase in thickness of the traveling web caused by the seams joining successive pieces or cuts of cloth will result in cutting and damaging the cloth or injuring the shearing blade if allowed to enter this narrow space. To prevent this injury manual or automatic means are provided to suspend the shearing of the cloth during the passage of the seam, either by increasing this spacing or by stopping or reversing the rotation of the rotary shearing blade. When the means for thus passing the seam without cutting it are automatic in their action, they are controlled and actuated by feelers or other detecting devices detecting and responding to the approach of the seam to the shearing point. And it is to this latter class of automatic seam-protecting mechanisms that the present invention has particular relation.

In my prior Patents Nos. 2,321,481 and 2,321,482, granted on June 8, 1943, I have disclosed a method and various apparatus operating on the basic principle of transmitting a detecting or actuating impulse through the web itself or through the path thereof as the seam passes by the detecting point, the utilization of such principle depending on the provision of an aperture or equivalent transmitting device in the traveling web at the seam or in predetermined spaced relation thereto, such means permitting the transmission through the web at the proper time of a continuously acting impulse tending to suspend the shearing action, the intervening cloth preventing the transmission of the impulse except through the apertures or other means in the cloth. One embodiment of this principle, that in my Patent No. 2,321,481, comprised a photo-electric cell normally prevented from acting by being shielded from light rays of actuating intensity by the cloth, but acting to cause the suspension of the shearing operation when the purposely formed interruptions in the continuity of the cloth admitted light rays to the cell. In this form of detector, it is thus necessary to provide apertures in the traveling web at the seam or in carefully predetermined relation thereto, in order to let the impulse pass through the traveling web or the path thereof.

In modern shears shearing the cloth at rates up to and exceeding 40 yards per minute a cut of cloth especially when of the usual cut length of 70 yards goes through the shear so rapidly that the joining of the leading end of the succeeding cut of cloth to the tail-end of the cut being shorn in time to avoid the necessity of stopping the shear has become a problem. For reasons of convenience in handling, it is customary to effect the joining of the successive cuts right at the shear by a portable sewing machine which rapidly stitches the two ends together throughout the entire width of the two pieces. To keep the production at maximum, all factors leading to delay or complication in this operation of preparing and sewing together the ends of the pieces should be avoided.

With this aim, and with the object of avoiding the necessity of slitting or punching the cloth or of forming or widening the piece-end seam to provide the necessary apertures, or of inserting a foreign element in the cloth to utilize the basic principle of my aforesaid patents of transmitting an impulse through the cloth from one surface thereof to the other, in order to actuate the detecting mechanism, I employ in accordance with the present invention an actuating impulse that is reflected from the surface of the cloth, without need to pass through the cloth as heretofore. In its preferred embodiment, I accomplish this through the use of a photo-electric cell scanning the surface of the traveling web at any suitable or desired location in the width thereof, and provide either at the seam to be protected or in predetermined spaced relation thereto on the surface of the cloth a spot, line, or area of different light-reflecting power than that of the rest of the surface of the cloth in the zone scanned by the cell, such that the cell will react to the change, either increase or decrease, in the light reaching it by reflection from the surface of the traveling web and thus energize an electrical circuit actuating the devices automatically suspending the shearing momentarily, and pass the seam past the blades without injury. The reflecting area actuating the cell can be either the seam itself, sewed with thread of different light reflecting power (contrasting color) from that of the surface of the cloth, or a spot or stripe of paint or other pigment or a chalk mark, or a bit of cloth, paper or Cellophane attached adhesively or otherwise, and located at the seam or in predetermined spaced relation thereto lengthwise of the cloth. Thus no additions or changes have to be made in the way of slitting or punching attachments to the sewing machine used, at the risk of adding malfunctions or delay to the operation of seaming, while the manual marking of the cloth with pigment, paper stickers, or the like, takes only an instant's time. As the photo-electric cell, like prior detectors, is located apart from and usually in advance of the shear blades in the length of the cloth, and time delay devices are accordingly used to delay the suspension of the shearing until the seam nearly reaches the blades, a simple adjustment of the time delay makes it possible to place the actuating spot at either side of the seam at any desired spaced relation therefrom lengthwise of the cloth while securing properly timed actuation of the shearing-suspending mechanism.

As cloth shears commonly employ a plurality of pairs of blades shearing the cloth repeatedly in the course of its travel through the machine, detector mechanisms of the type of the invention each independently controlling the suspension of the shearing of a different blade assembly are provided at different points in the course of the cloth through a multi-blade shear.

An illustrative embodiment of the invention is shown in the accompanying drawing, which is a diagrammatic side elevation of a single-bladed cloth shearing machine, showing electrically operated blade-lifting devices and a photo-electric cell controlling the latter and actuated by reflection from the surface of the traveling cloth.

The drawing shows only so much of the cloth-guiding and shearing parts of a standard Parks and Woolson single-bladed cloth shear as is necessary for a complete understanding of the application of the invention thereto, some of the framework, guides, drives, and other familiar parts of the machine not concerned with the invention being omitted with the understanding that they are or may be as usual.

The course of the web 1 of cloth is as indicated by the arrows, being propelled through the machine by draft rolls 3, 5, and guided by numerous cloth rolls 7, 9, over beam 11, and thence over the cloth-rest 13, at the sharp edge of which the shearing is effected by rotary helical blade 15 and cooperating ledger blade 17. As usual, both blades are carried by a swinging supporting structure termed the blade frame having brackets 19 at each side of the machine and pivotally mounted by means of shaft 21 which rocks in journal boxes 23 adjustable up or down on the frame 25 of the machine. This pivotal mounting enables the blades to be brought into or out of shearing relation with the cloth as the latter passes around the acute angle of the rest 13, and thus permits the blades to be lifted away from the cloth-rest to suspend the shearing, as in passing the seams, without need to check the rotation of the rotating blade 15. Thereafter the cloth passes downward and around draft roll 5 and numerous guide rolls to near floor level, whence it proceeds onward to a second or third shearing by devices substantially duplicating those here shown.

In accordance with the invention, at a convenient point in the course of the cloth prior to its arrival at the cloth-rest 13, herein in the interval of the upward travel of the web between guide rolls 7 and 9, a photo-electric cell or "electric eye" 27 with its relay are located at one side of the plane of the traveling web 1, the cell being situated close to the surface of the web and far enough in from the lateral margins thereof to be shielded by the cloth from all light of sufficient intensity to actuate the cell except that reflected into it from the surface of the cloth.

A small spotlight 30 or other light source of moderate intensity is mounted adjacent the cell 27 or in any convenient location, and arranged to illuminate the zone in the width of the cloth which is scanned by the cell. Preferably, the axis of the beam and the axis of the cell are set at equal but opposite angles with respect to the plane of the cloth, and intersect at the same point in such plane, so that the light reflected from the surface in connection with the cloth will be reflected to a maximum degree, and as directly as possible, into the cell 27.

When an actuating marker apart from the thread used in stitching the seam itself is to be used, there is applied to the cloth in the zone thereof which passes directly in front of the photo-electric cell 27 and is thus scanned by the cell, a spot of pigment, paper or otherwise, herein illustrated as a paper sticker 29 adhesively attached and of exaggerated thickness for convenience of illustration in the view taken. It is applied in any desired spaced relation to the seam 31 joining two consecutive cuts or pieces forming the otherwise continuous web 1 and as stated is applied before the joined portions enter the cloth shear.

Photo-electric cell unit 27 is connected by means of wires 28 with a source of low voltage electric current 30 and a time delay relay 32 which latter acts following closing of this circuit through the described actuation of cell 27 to energize a solenoid 34 with power from a higher-voltage source 36, such latter action occurring after the lapse of a period of time, determined by the setting of the control knob on relay 32, sufficient to permit the seam 31 to approach to within an inch or two of the shearing point at the apex of rest 13. This actuation of the solenoid 34 draws downward its armature 37 which is pivoted to a link 43 pivotally connected with a lever 38 fulcrumed on a bracket 39 on the frame 25 and having a pin 40 working a link 41 which in turn is pivotally connected to the reduced eccentrically disposed extremity 42 of a pin 44 held in a clamping bracket 46 fixed to bracket 19 of the blade frame, thus rocking the blade frame about the axis of shaft 21 in a direction lifting the rotating and ledger blades as a unit away from cloth-rest 13 to pass the seam.

Adjustment of the angular position of eccentric extremity 42 about the axis of pin 44 varies the degree of lift of the blades away from cloth-rest 13, and thus affords one means of timing the length of jump of the blades in passing the seam; alternatively, a second time delay relay (not shown) similar to 32 is employed to break the power circuit to solenoid 34 established and in this case held by relay 32, the supplemental relay being set to open the power circuit and restore the blades to shearing position after the passage of the seam plus any desired length of cloth forming a suitable margin of safety. Likewise, control of the voltage supplied to solenoid 34 is used in certain instances to vary the power of solenoid 34 and thus to control the duration of the lift and the length of the jump in passing the seam.

Application of the devices of the invention to multiple-bladed shears is effected by simply duplicating the means shown and described herein for each shearing unit of the multiple shear, in obvious manner. The present devices are equally applicable to shears employing gap-rests in place of the solid cloth-rest shown.

While I have illustrated and described a certain form in which the invention may be embodied, I am aware that many modifications may be made therein by any person skilled in the art, without departing from the scope of the invention as expressed in the claims. Therefore, I do not wish to be limited to the particular form shown, or to the details of construction thereof, but What I do claim is:

1. In a cloth shear, in combination, means propelling, guiding, and shearing the cloth, a light-actuated element normally shielded from direct light rays of actuating intensity by the cloth, means applied to the cloth having different light-reflecting power, and means suspending the shearing operation and called into action by the element through a variation in the amount of light reflected to the element from a surface in connection with the cloth as the first-named means passes the element.

2. In a cloth shear, in combination, means propelling, guiding, and shearing the cloth, means suspending the shearing operation to pass a seam in the cloth, means responding to a change in the amount of light reflected by a surface in connection with the cloth by actuating the shearing-suspending means, and means applied to the cloth having different light-reflecting power to effect such change.

3. In a cloth shear, in combination, means propelling, guiding, and shearing the cloth, means suspending the shearing operation to pass a seam in the cloth, a photo-electric cell responding to a change in the amount of light reflected by a surface in connection with the cloth by actuating the shearing-suspending means, and means applied to the cloth having different light-reflecting power to effect such change.

4. In a cloth shear, in combination, means propelling, guiding, and shearing the cloth, means suspending the shearing operation to pass a seam in the cloth, means determining the moment of initiation of the suspension of shearing by such means including a photo-electric cell actuated by a change in the amount of light reflected from a surface in connection with the cloth, and means applied to the cloth having different light-reflecting power to effect such change.

5. In a cloth shear, in combination, means propelling, guiding, and shearing the cloth, means suspending the shearing operation to pass a seam in the cloth, a photo-electric cell scanning the surface of the cloth and calling the shearing-suspending means into action in response to a change in the amount of light reflected to the cell from a surface in connection with the cloth, means illuminating the zone of the width of the cloth scanned by the photo-electric cell, and means applied to the cloth having different light-reflecting power to effect such change.

6. In a cloth shear, in combination, means propelling, guiding, and shearing the cloth, means suspending the shearing operation to pass a seam in the cloth, a photo-electric cell actuated by a change in the amount of light reflected from a surface in connection with the cloth and itself actuating the shearing-suspending means, means applied to the cloth having different light-reflecting power to effect such change, and time-delay means intervening between the cell and the shearing-suspending means.

7. In a cloth shear, in combination, means propelling, guiding, and shearing the cloth, blade-lifting means including an electric magnet, a time-delay device controlling the energizing of the magnet, light-actuated means responding to a change in the amount of light reflected from a surface in connection with the cloth by actuating the time-delay device, means applied to the cloth having different light-reflecting power to effect such change, and means illuminating the said surface.

WILFRED N. HADLEY.